(12) United States Patent
Marchioro

(10) Patent No.: US 6,681,522 B2
(45) Date of Patent: Jan. 27, 2004

(54) FLOWER BOX

(75) Inventor: Domenico Marchioro, Castelnovo di Isola Vincentina (IT)

(73) Assignee: Marchioro S.p.A. Stampaggio Materie Plastiche, Castelnovo di Isola Vicentina (IT)

( * ) Notice: Subject to any disclaimer, the term of this patent is extended or adjusted under 35 U.S.C. 154(b) by 0 days.

(21) Appl. No.: 09/902,761

(22) Filed: Jul. 12, 2001

(65) Prior Publication Data

US 2002/0007589 A1 Jan. 24, 2002

(30) Foreign Application Priority Data

Jul. 19, 2000 (IT) ...................... PD2000A0186

(51) Int. Cl.[7] ............................... A01G 9/02
(52) U.S. Cl. .................. 47/65.5; 47/66.1; 47/66.6; 47/68; 47/70; 47/86
(58) Field of Search .............. 47/65.5, 66.1, 47/66.3, 66.4, 66.6, 68, 83, 86, 70, 44; 220/4.01, 4.29, 4.31; 206/423, 503, 511; 52/36.1, 36.6, 239, 653.1, 40, 113; 256/66, 65.06, 58, 47, 50, 65.14, 68; 217/65

(56) References Cited

U.S. PATENT DOCUMENTS

| | | | | |
|---|---|---|---|---|
| 842,703 A | * | 1/1907 | Roberts et al. | |
| 1,407,664 A | * | 2/1922 | Niederberger | 47/66.1 |
| 3,021,114 A | * | 2/1962 | O'Connel | 256/24 |
| 3,327,440 A | * | 6/1967 | Watkins | 248/340 |
| 3,797,184 A | * | 3/1974 | Thompson | 52/239 |
| 4,631,861 A | * | 12/1986 | Wuthrich | 47/70 |
| 4,867,327 A | * | 9/1989 | Roland | 217/12 R |
| 5,752,341 A | * | 5/1998 | Goldfarb | 47/78 |
| 5,809,734 A | * | 9/1998 | Turner | 182/134 |
| 5,899,035 A | * | 5/1999 | Waalkes et al. | 52/239 |
| 5,953,858 A | * | 9/1999 | Loosen | 47/66.1 |
| 6,092,333 A | * | 7/2000 | Steffan | 47/83 |
| 6,351,917 B1 | * | 3/2002 | MacDonald et al. | 52/239 |
| 6,367,631 B1 | * | 4/2002 | Steigerwald | 206/459.5 |

FOREIGN PATENT DOCUMENTS

| | | | | |
|---|---|---|---|---|
| DE | 21 63 088 | | 6/1973 | |
| DE | 2605256 | * | 2/1975 | A01G/9/02 |
| DE | 26 05 256 | | 8/1976 | |
| DE | 86 26 887 | | 1/1987 | |
| DE | 3925851 | * | 5/1990 | F16B/12/46 |
| EP | 0 517 117 | | 12/1992 | |
| FR | 2 557 760 | | 7/1985 | |
| FR | 2641443 | * | 7/1990 | A01G/9/02 |
| FR | 2684838 | * | 6/1993 | A01G/1/08 |
| FR | 2707135 | * | 1/1995 | A01G/9/12 |

* cited by examiner

Primary Examiner—Peter M. Poon
Assistant Examiner—Andrea M. Valenti
(74) Attorney, Agent, or Firm—Guido Modiano; Albert Josif; Daniel O'Byrne

(57) ABSTRACT

A flower box having posts and wall elements connected by first reversible anchoring devices, the wall elements being in turn reversibly associated with at least one corresponding bottom so as to provide, as a whole, full vertical and horizontal flexibility in assembling the flower box.

24 Claims, 9 Drawing Sheets

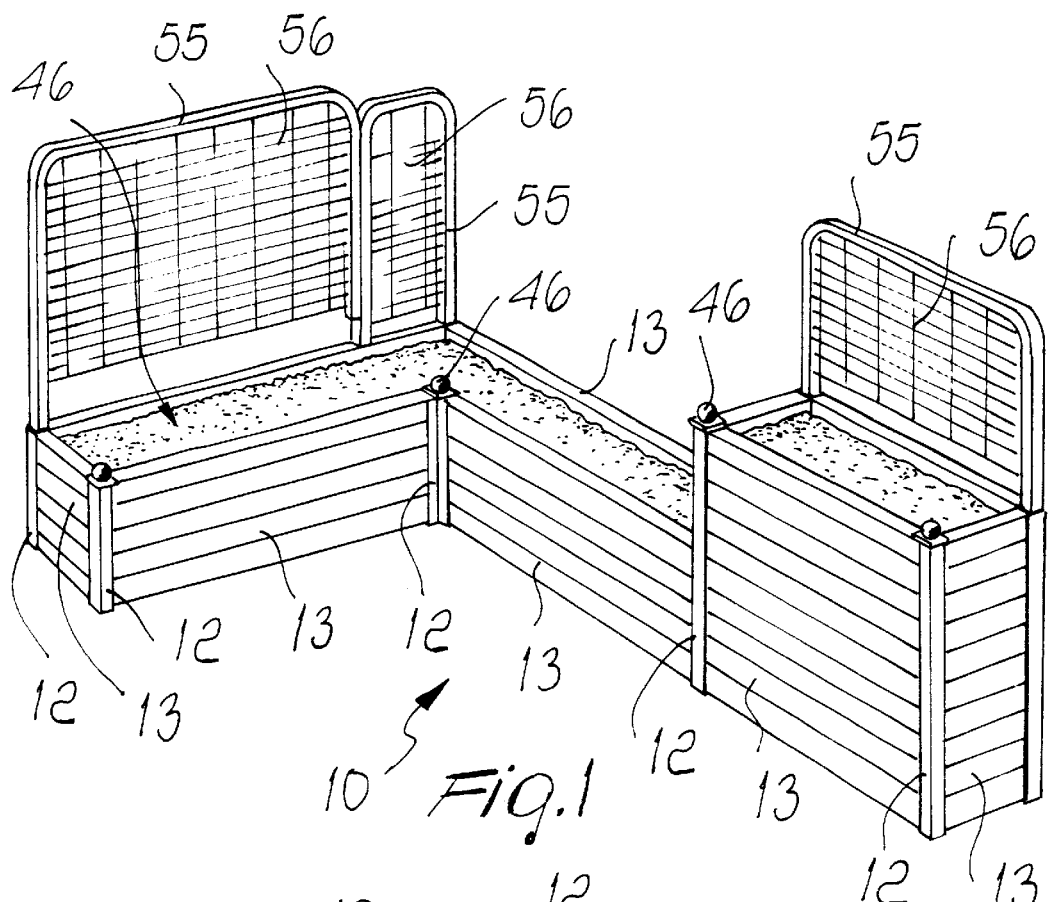
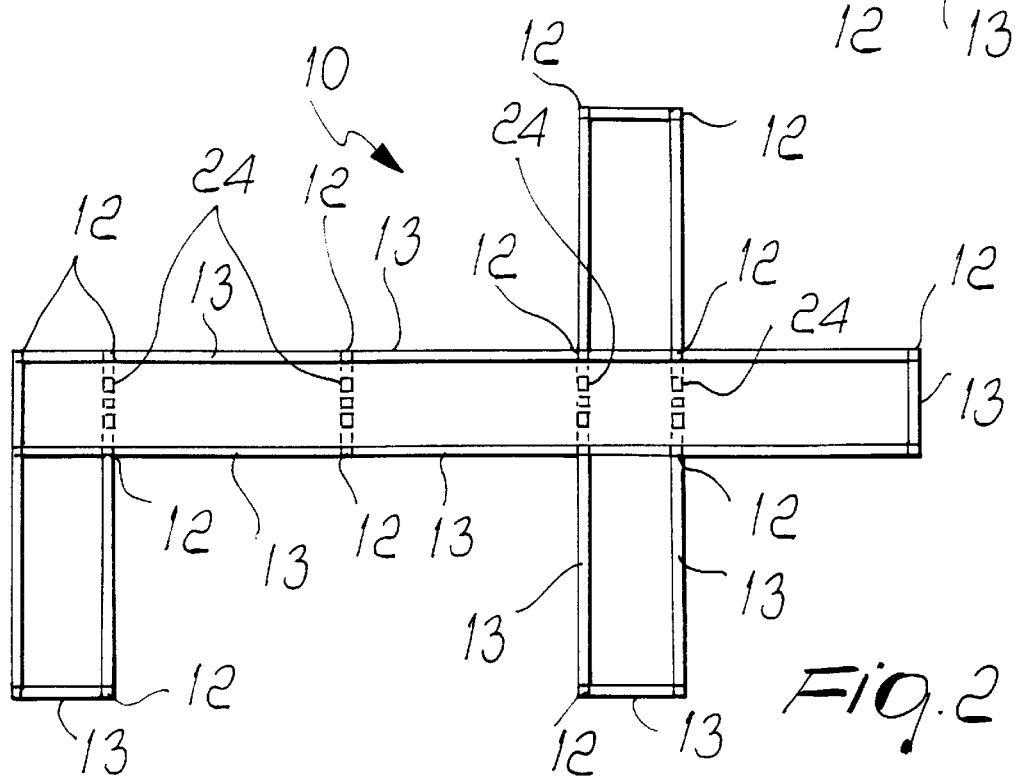

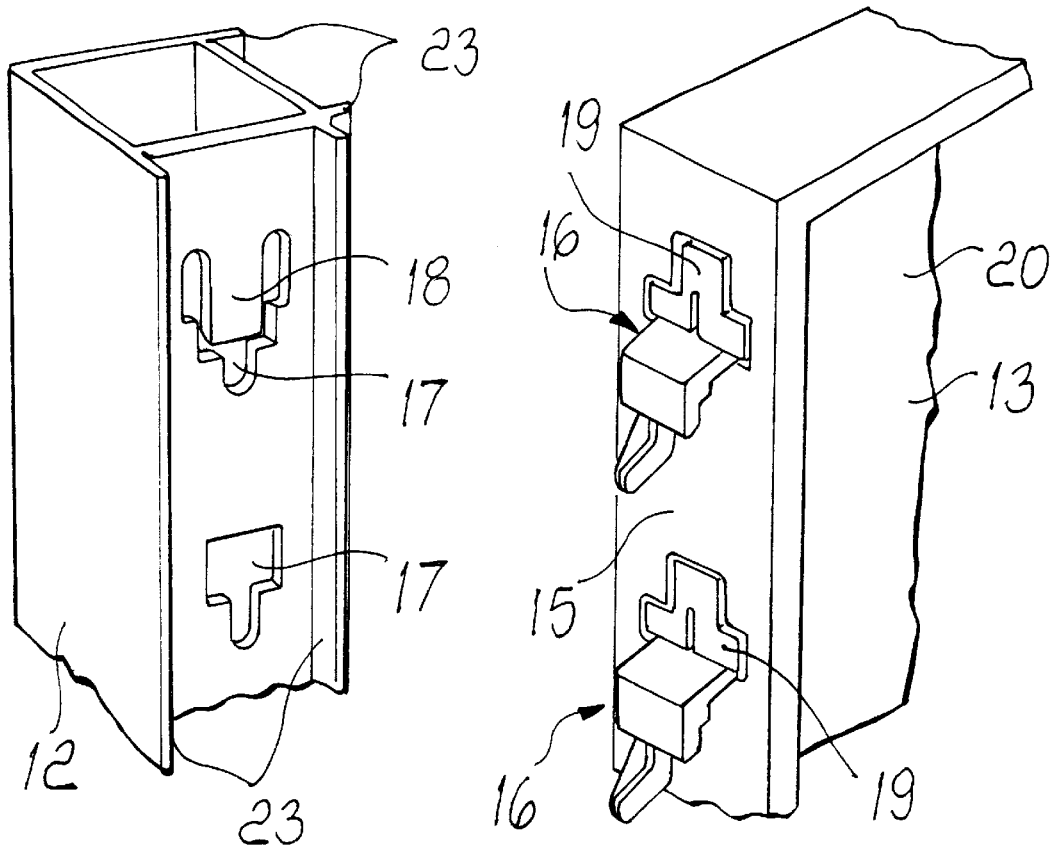
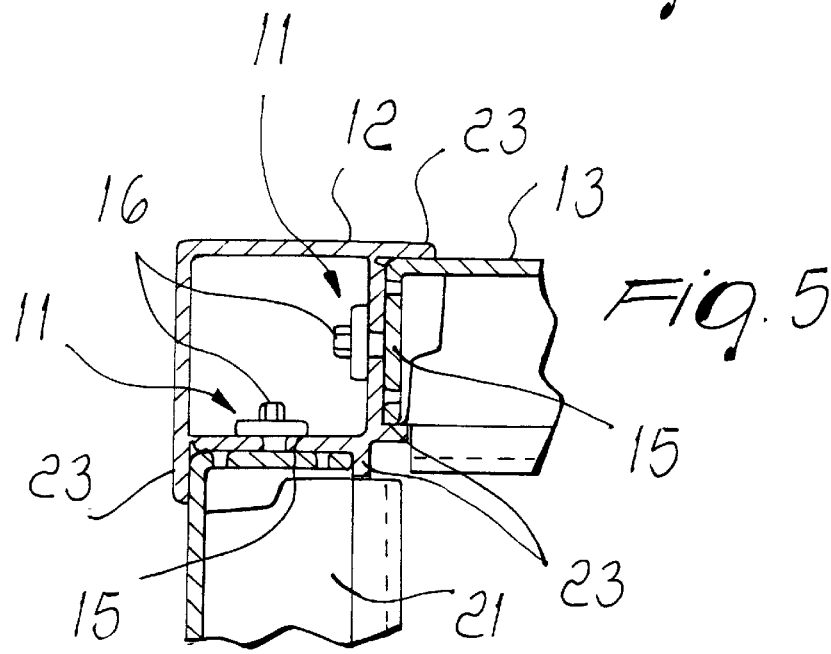
Fig. 3  Fig. 4
Fig. 5

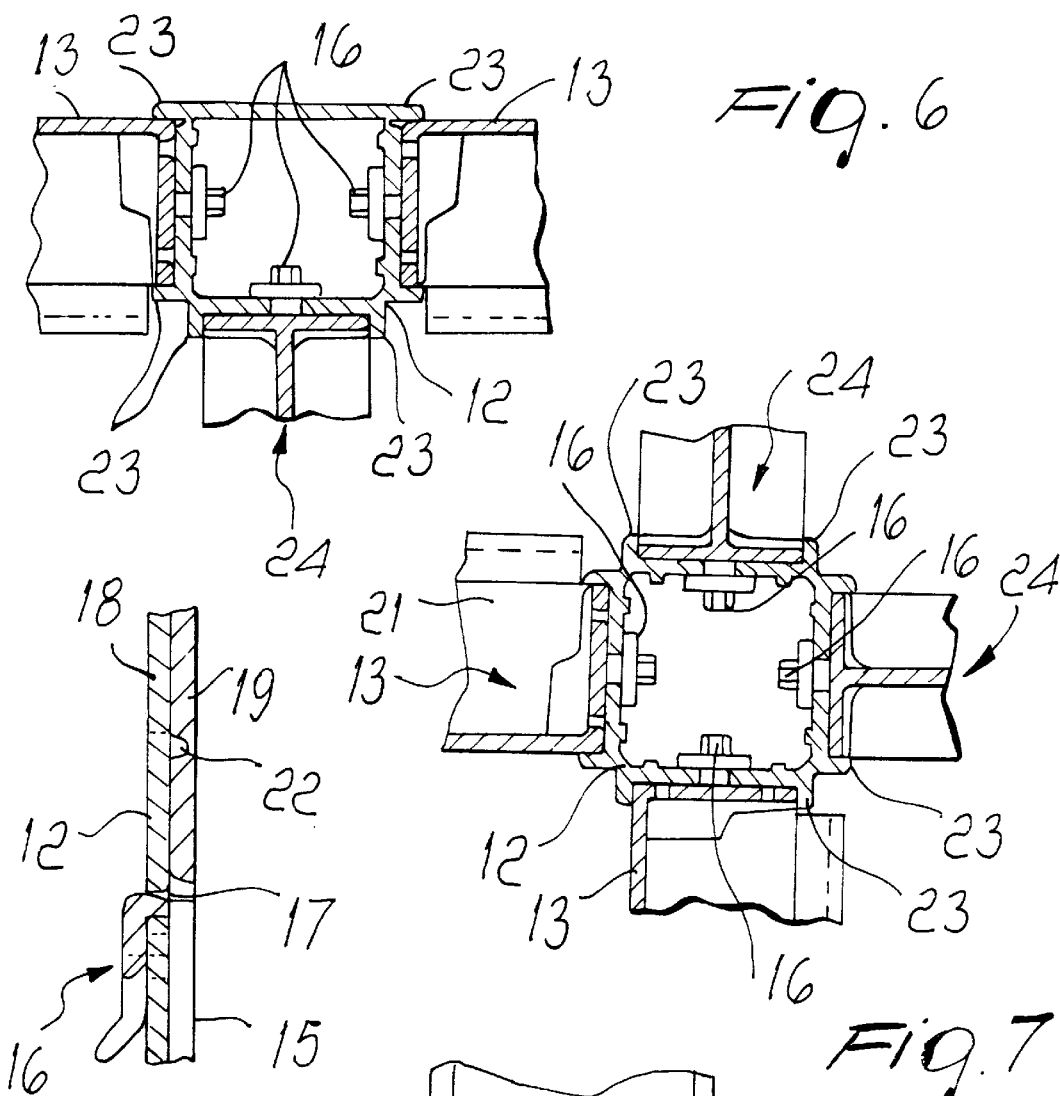
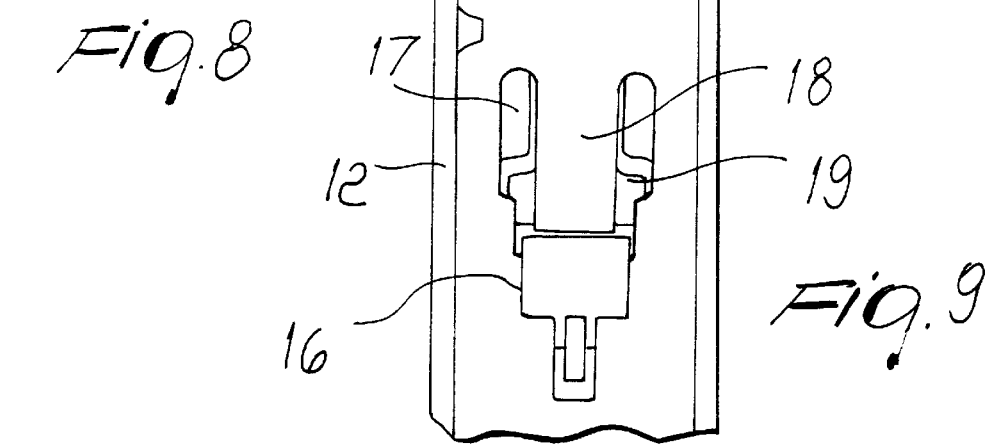

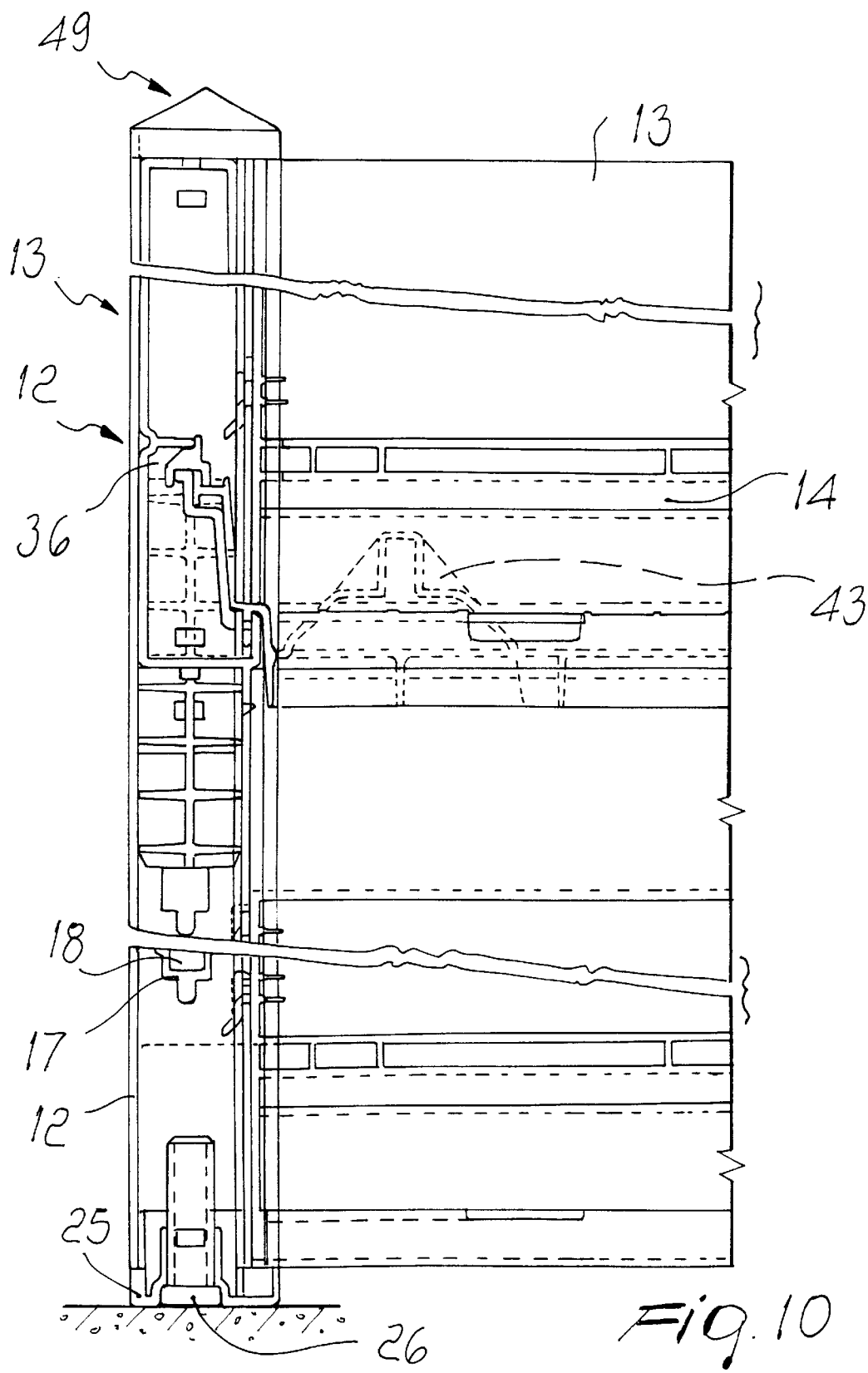

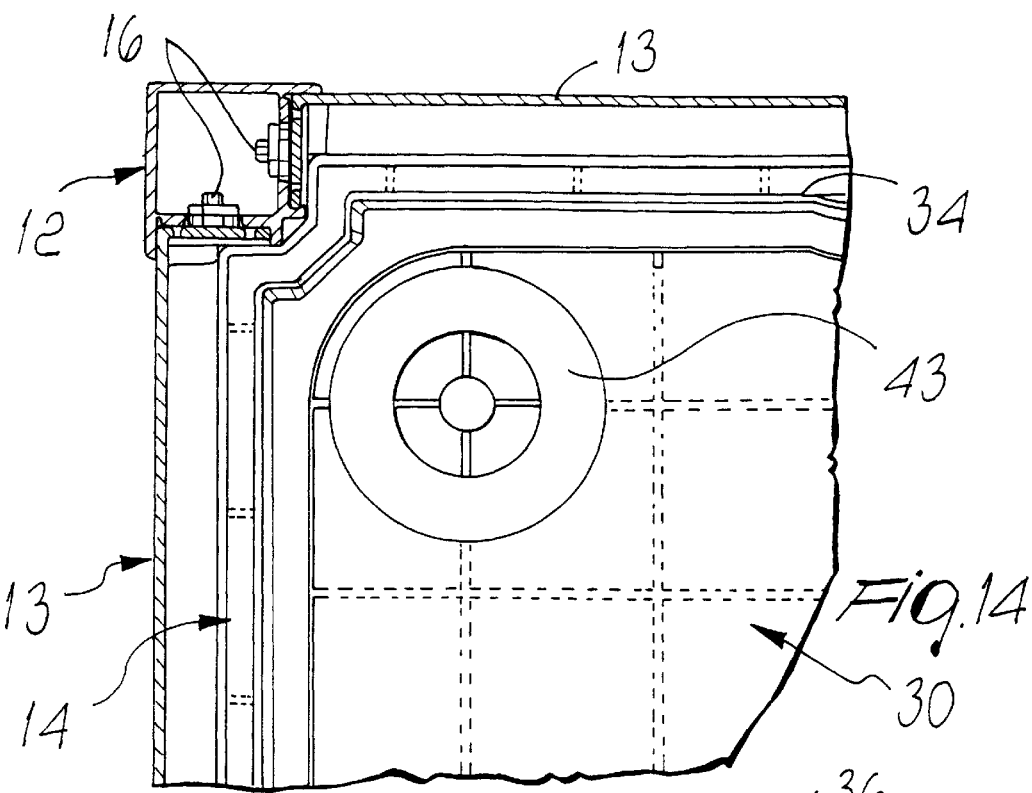
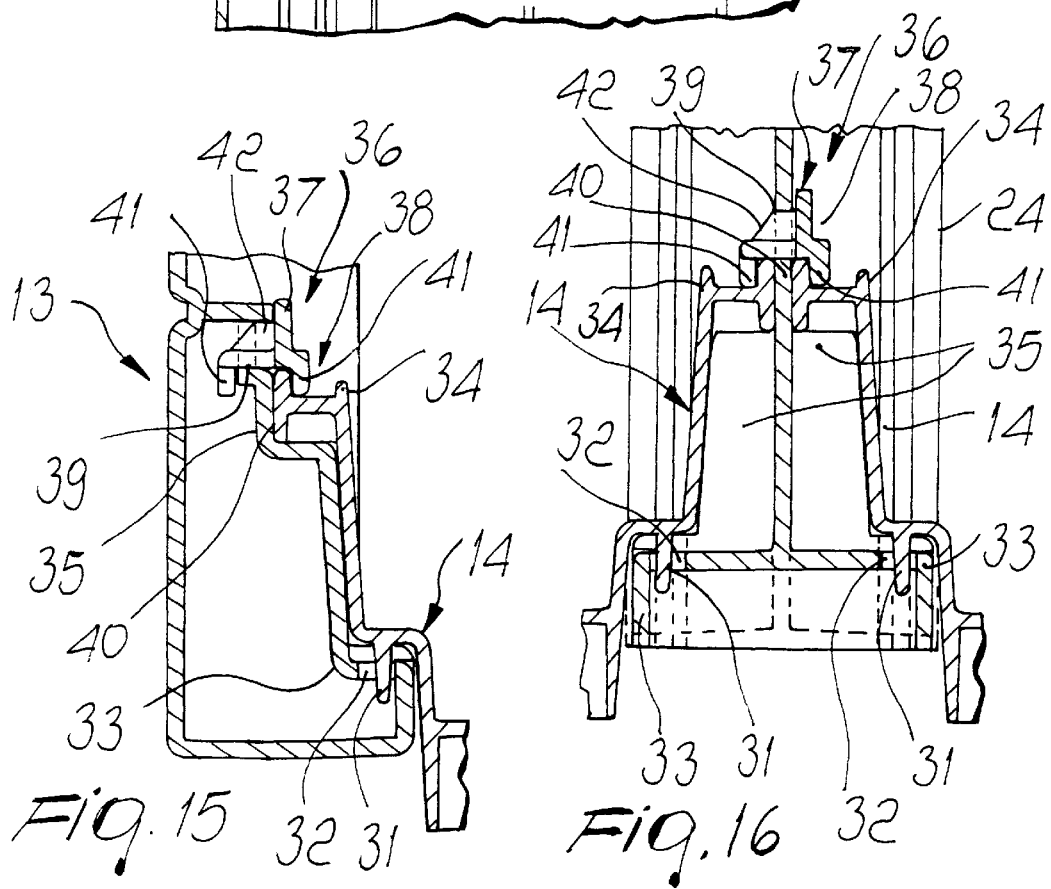

FLOWER BOX

BACKGROUND OF THE INVENTION

The present invention relates to a flower box.

Flower boxes have long been used successfully for decoration in several indoor and outdoor settings; such flower boxes must ensure optimum survival of the plants placed therein and may also have to ensure the possibility to easily remove and position them according to requirements.

Merely by way of example, one can consider stands at exhibitions, indoor and outdoor displays, as well as more permanent situations in which, due to contingent or other reasons, it is perhaps necessary to temporarily remove the flower boxes.

Currently, especially if the set of flower boxes is particularly large, it is necessary to resort to specialized equipment and personnel, with a considerable time investment.

Moreover, currently, in order to achieve some degree of modularity, the flower box must be substantially constituted by a set of pot-like elements having different shapes, which are entirely independent of each other and are connected or simply placed adjacent thereafter.

However, this solution does not ensure full integration of the set, and besides to being often aesthetically inadequate one is often compelled to provide temporary solutions which are not entirely satisfactory.

SUMMARY OF THE INVENTION

The aim of the present invention is to provide a flower box whose structure solves the above-mentioned drawbacks suffered by known flower boxes, by particularly ensuring optimum modularity and flexibility in assembly, both horizontally and vertically, and further ensuring that the most disparate requirements of application are met.

Within this aim, an object of the present invention is to provide a flower box whose structure can be easily assembled without particular technical expertise, thus ensuring, at least in its less challenging configurations, that assembly and disassembly be performed to a large extent even by unspecialized personnel.

Another object of the present invention is to provide a flower box whose structure is, in its modularity and flexibility in assembly, particularly sturdy and suitable for ideal bedding of substantially any type of plant or vegetable in general.

A further object of the present invention is to provide a flower box whose structure is particularly sturdy and for which a high level of standardization can be provided during production.

A still further object of the present invention is to provide a flower box whose structure can be manufactured in models having a high level of aesthetic and styling content and by way of technologies and equipment known per se.

This aim and these and other objects which will become better apparent hereinafter are achieved by a flower box according to the invention, characterized in that it comprises posts and wall elements which are connected one another by first reversible anchoring means, said wall elements being in turn reversibly associated with at least one corresponding bottom so as to provide, as a whole, full vertical and horizontal flexibility in assembly of the flower box.

Advantageously, each one of said first reversible anchoring devices comprises a first tab which is shaped like a contoured hook, is monolithic with respect to one side of a corresponding wall element, and is suitable to enter and anchor itself in a corresponding through hole provided in the corresponding post, the rim of said hole being shaped so as to define, in an upward region, a first elastically flexible wing which is suitable to ensure the engagement and locking of said first inserted tab, each one of said first anchoring devices also comprising a corresponding second elastically flexible disengagement wing which is suitable to face, on assembly, a corresponding said first wing and is available to the action of the operator so as to cause the disengagement of said wing from the locking of the corresponding first tab.

BRIEF DESCRIPTION OF THE DRAWINGS

Further characteristics and advantages of the flower box according to the present invention will become better apparent from the description of an embodiment thereof, illustrated only by way of non-limitative example in the accompanying drawings, wherein:

FIG. 1 is a perspective view of a flower box having the structure according to the invention;

FIG. 2 is a plan view of the flower box of FIG. 1;

FIGS. 3 and 4 are perspective views of different parts of a same detail of the flower box of FIG. 1;

FIG. 5 is a sectional view of a detail of the flower box of FIG. 1;

FIG. 6 is another view of another detail of the flower box of FIG. 1;

FIG. 7 is still another partially sectional view of another detail of the flower box of FIG. 1;

FIGS. 8 and 9 are two partially sectional views of a same detail of the flower box of FIG. 1;

FIG. 10 is a partially sectional view of part of the flower box of FIG. 1;

FIG. 14 is a sectional view of part of the flower box of FIG. 1;

FIGS. 15 and 16 are views of two other embodiments of a same detail of the flower box of FIG. 1;

DESCRIPTION OF THE PREFERRED EMBODIMENTS

Figures 11, 12:
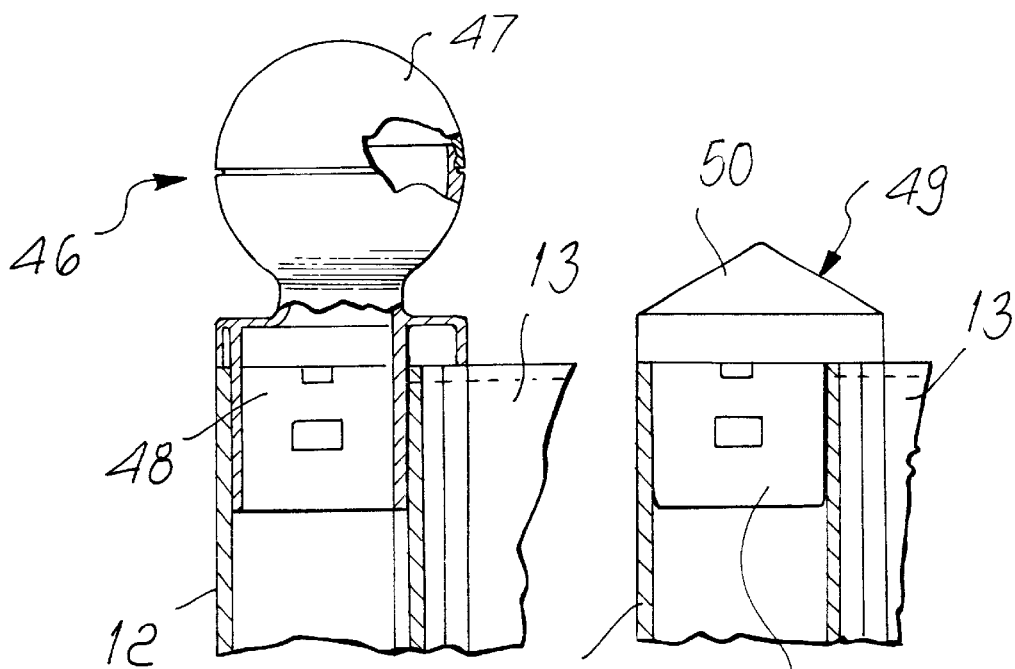
FIG. 11 is a partially sectional view of a detail of the flower box of FIG. 1.
FIG. 12 is another sectional view of another detail of the flower box of FIG. 1.
Figure 13:
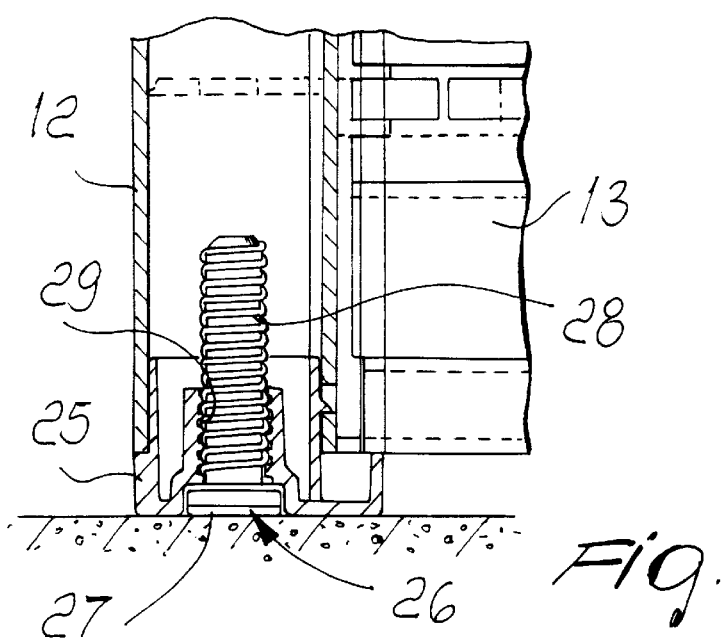
FIG. 13 is a partially sectional view of another detail of the flower box of FIG. 1.
Figure 17:
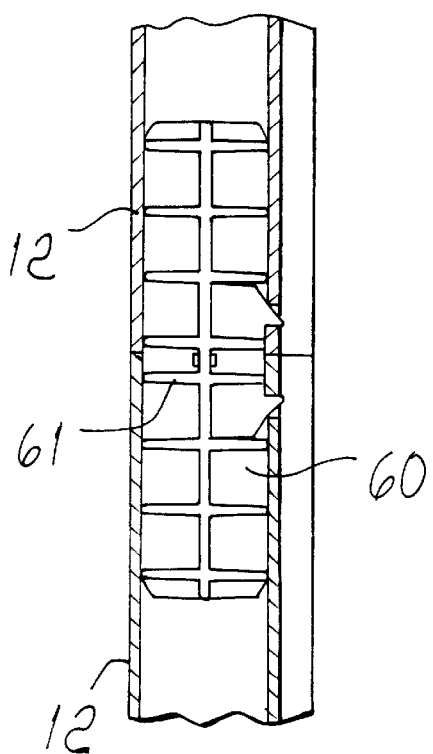
FIG. 17 is a partially sectional view of a detail of the flower box of FIG. 1.
Figure 18:
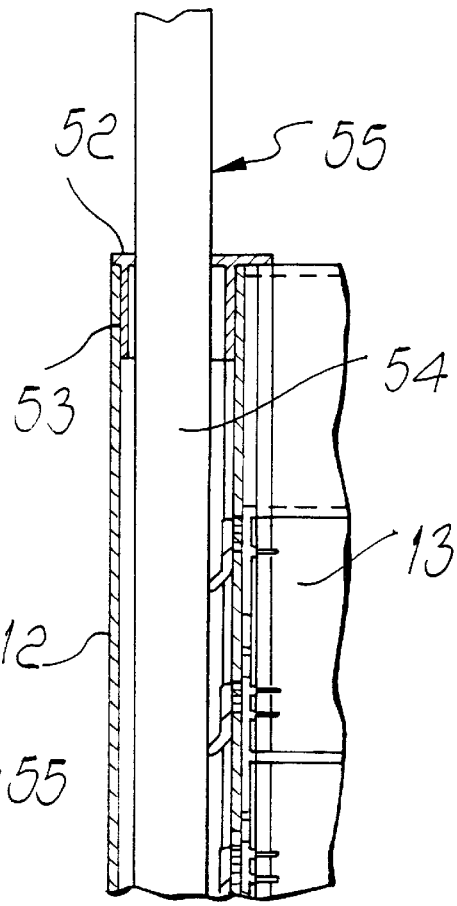
FIG. 18 is another partially sectional view of another detail of the flower box of FIG. 1.
Figure 19:
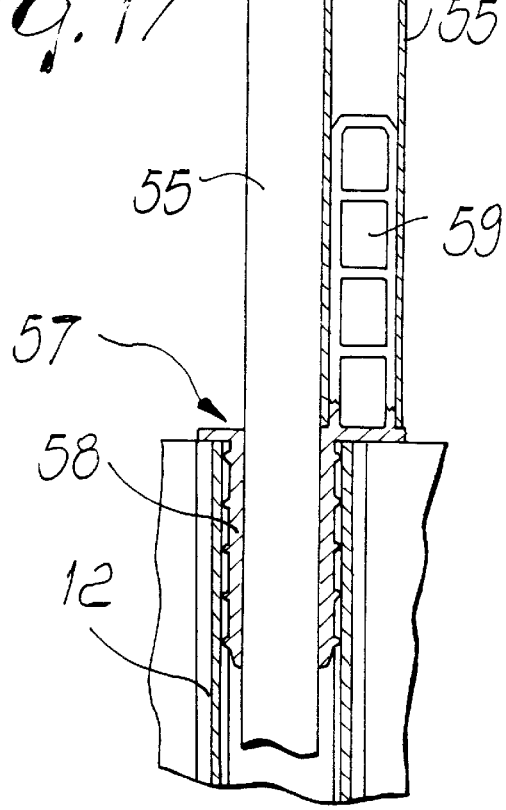
FIG. 19 is a sectional view of another detail of the flower box of FIG. 1.
Figure 20:
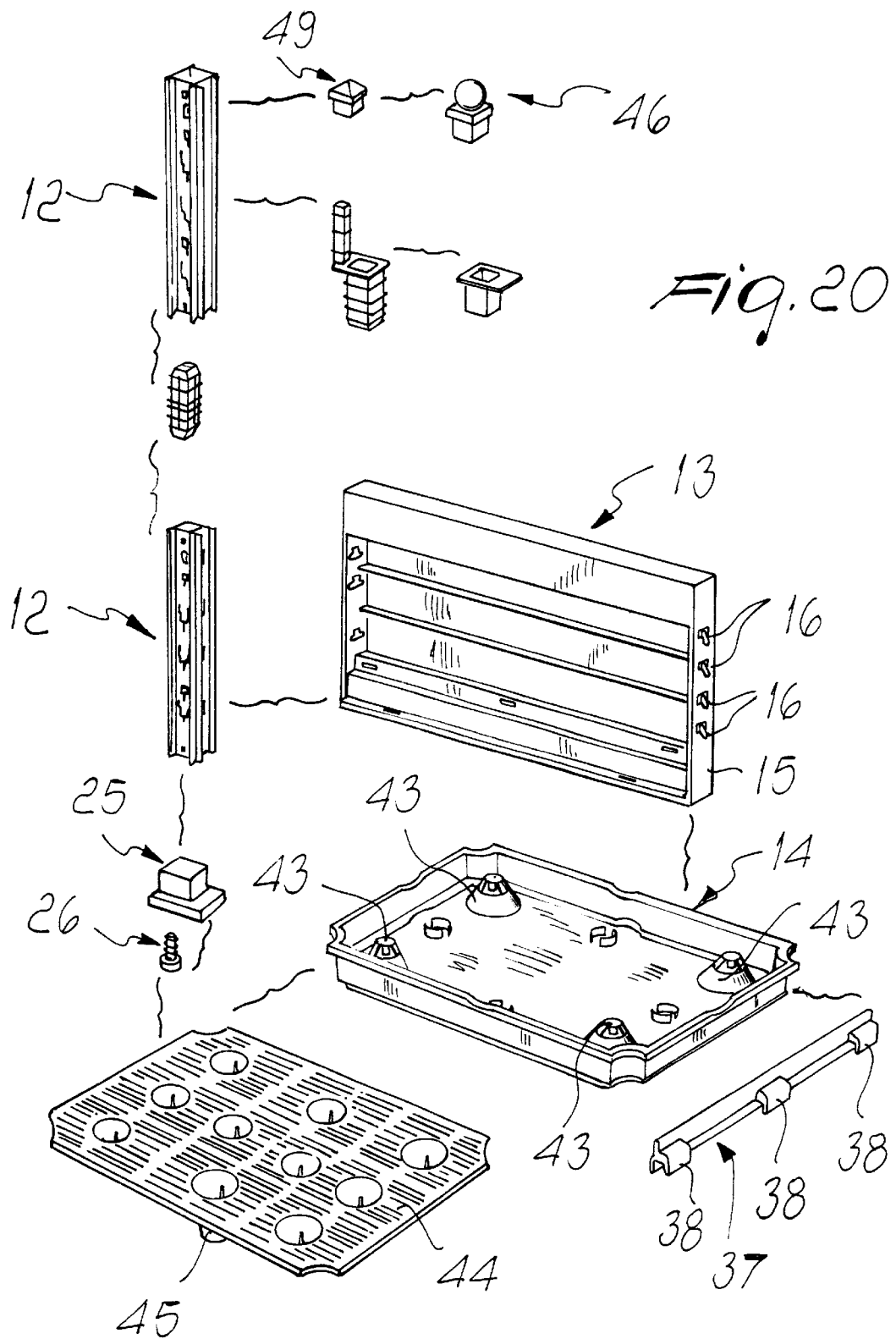
FIG. 20 is an exploded view of part of the flower box of FIG. 1.
Figure 21:
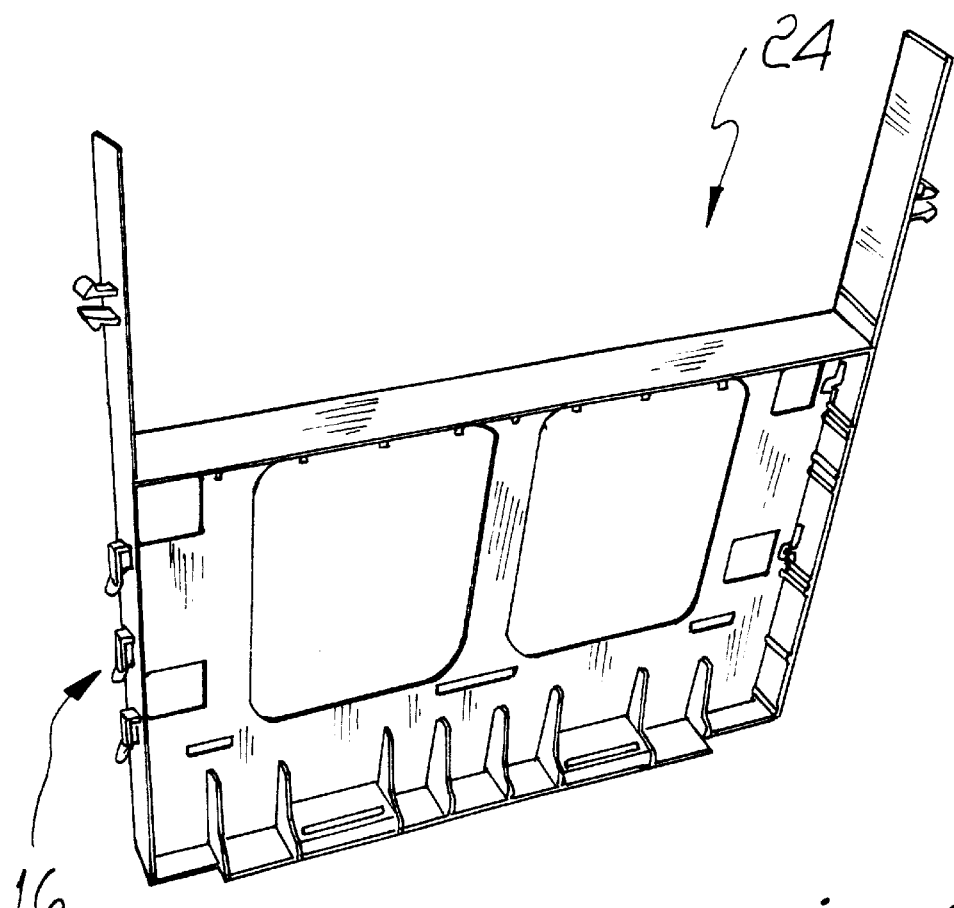
FIG. 21 is a view of a partition of the wall of the flower box of FIG. 1.

With reference to FIGS. 1 to 21, a flower box having the structure according to the invention is generally designated by the reference numeral 10.

The flower box 10 comprises posts 12 and wall elements 13, which are connected by means of first reversible anchoring elements, generally designated by the reference numeral 11, and are in turn reversibly associated with one or more corresponding bottoms, in this case one, which is shown and designated by the reference numeral 14, so as to provide as a whole the total horizontal and vertical flexibility in assembly of the flower box 10.

Each one of the first devices 11 comprises a first tab 16 which is shaped like a contoured hook, is monolithic with respect to one side 15 of a corresponding wall element 13, and is suitable to enter and anchor itself in a corresponding through hole 17 formed in the corresponding post 12.

The rim of the hole 17 is shaped so as to define, in an upward region, a first elastically deformable wing, which is suitable to ensure the engagement and locking of the first inserted tab 16.

Each one of the first anchoring devices 11 also comprises a corresponding elastically deformable second disengagement wing 19, which is suitable to face, on assembly, a corresponding first wing 18 and is available to the action of the operator so as to cause the disengagement of said wing from the locking of said corresponding tab 16.

In practice, each one of the wall elements 13 is substantially constituted by a panel 20 provided with internal reinforcement ribs and folded edges, generally designated by the reference numeral 21.

The second wing 19 is also provided with a portion 22 for assisting elastic bending whose imaginary pivoting axis lies above the corresponding first tab 16.

In particular, in this first embodiment both the wall elements 13 and the corresponding posts 12 are actually provided with a plurality of first devices 11 which are aligned in a vertical series.

Moreover, the posts 12 have, in this case, a substantially square cross-section but have different configurations of the series of holes 17, thereby ensuring the abovementioned modularity and flexibility in assembly of the flower box 10 as a whole.

In particular, there are posts 12 provided with two series of holes 17 which are arranged opposite one another, but there are also posts 12 provided with series of holes arranged on three adjacent sides, which therefore ensure a T-shaped connection of the elements 13, or posts 12 with four sides in which the series of holes 17 and the corresponding first wings 18 are provided, so as to ensure therefore a substantially cross-shaped connection of wall elements 13.

The square cross-section of the posts 12, however, in other embodiments can be easily modified during production in order to ensure the most disparate conceivable geometries and orientations of the connection.

In general, it is therefore possible to conceive a substantially polygonal cross-section of the post 12, by arranging the series of through holes 17 of the corresponding first wings 18 so as to ensure said variety of orientation and connection.

In particular, in this case, each one of the posts 12 also has longitudinal edge ribs 23 for guiding the insertion of the corresponding wall elements 13.

The flower box 10 also comprises wall partitions 24 (FIG. 21) which are provided with through holes; said partitions 24 are used in particular as dividers in very long longitudinal configurations so as to ensure some form of soil containment and the separation of any different plant types.

The partitions 24 are provided with the tabs 16 of the same interlocking means as the wall elements 13.

The posts 12, which as a whole have a substantially tubular structure, are each associated in a downward region with a corresponding plug 25, which is adjustably coupled to a corresponding foot 26.

In particular, in this case the foot 26 is constituted by a screw element with a head 27 for resting on the ground and a threaded stem 28 coupled to a corresponding threaded hole 29 formed in the plug 25.

Each one of the bottoms 14 is constituted, in this case, by a tray-like monolithic element 30 provided perimetrically and externally with second laminar tabs 31 which are suitable to enter suitable holes 32 formed at a corresponding shaped region 33 of the lower portion of the wall elements 13 (or of the partitions 24 in a fully similar manner).

In particular, the bottoms 14 also have a perimetric folded edge 34 which rests, substantially for centering, on a corresponding recess 35 being formed in the corresponding wall elements 13 (or in the partitions 24, in a fully similar manner).

Each one of the bottoms 14 is fixed to corresponding wall elements 13 and to the partitions 24 by way of corresponding second reversible anchoring devices 36.

More specifically, each one of the second devices 36 comprises a rod-like element 37 having, in this case, three bridge-like sections 38 which are suitable to enter corresponding holes 39 formed in the corresponding wall element 13 so as to lock the corresponding rim 40 together with part of the folded edge 34 of the corresponding bottom 14.

In particular, each one of the bridge-like sections 38 comprises two parallel flaps 41, suitable to form a corresponding number of engagement jaws and, in an upward region, a lug 42 suitable to reversibly engage the rim 40 of the corresponding insertion hole 39.

In particular, each one of the bottoms 14 is provided with studs for the spaced support of a grille-like panel 44 which in turn has frustum-shaped feet 45.

The studs 43 also act as seats for castors (not shown) which can be applied.

The flower box 10 also comprises upper shaped knobs which can be inserted in corresponding posts 12.

More specifically, in this case, the knobs are shown in two different constructive variations: a first one, generally designated by the reference numeral 46, being provided with a spherical knob 47 and an insertion tang 48, and a second one 49, with a pyramid-like end 50 and a tang 51 for insertion in the corresponding post 12.

In any case, the shape of the upper elements is, in practice, the most disparate and can be managed in accordance with the overall styling of the flower box 10.

The flower box 10 also comprises bases 52 with a tang 53 for insertion in corresponding posts 12, in which the corresponding end piece 54 of the frame 55 of trellises 56 can be inserted and supported.

A constructive variation of the bases 52, generally designated by the reference numeral 57, provides in addition to a tang 58 a monolithic vertical pin 59 which is suitable to enter a corresponding frame 55 of a corresponding trellis 56 so as to provide a side-by-side continuation of adjacent trellises.

The flower box 10 also comprises connecting elements 60 with corresponding reinforcement ribs 61 which are suitable to be inserted in corresponding posts 12 so as to allow the extension and stacking of the posts 12 and accordingly of the wall elements 13 and of the partitions 24 and, therefore, of the flower box 10 as a whole.

In practice it has been found that the present invention has achieved the intended aim and objects.

In particular, attention is called to the extreme versatility and flexibility in assembly of the flower box having the structure according to the invention, which in practice can be adapted to the most disparate requirements of application.

The present flower box is in fact flexible in assembly both horizontally and vertically and can also be provided individually with a rectangular or square shape while maintaining the same features and possibilities (insertion of trellises, wheels, et cetera).

Attention is also called to the fact that the flower box can be used as a cachepot.

It should also be noted that the variety of shapes and embodiments can be achieved in practice with a structure which, as a whole, is highly modular and therefore can also be mass-manufactured.

Finally the simplicity of assembly and disassembly should be noted, which in practice require no particularly specialized personnel and as a whole requires short execution times even in particularly complicated installations.

It should also be noted that the assembly is sturdy on the whole and offers the possibility to provide flower boxes having a high level of aesthetic and styling content.

The present invention is susceptible of numerous modifications and variations, all of which are within the scope of the appended claims.

The technical details may be replaced with other technically equivalent elements.

The materials and the dimensions may be any according to requirements.

The disclosures in Italian Patent Application No. PD2000A000186 from which this application claims priority are incorporated herein by reference.

What is claimed is:

1. A flower box, comprising posts and wall elements which are connected one another by first reversible anchoring devices, said wail elements being in turn reversibly associated with at least one corresponding bottom so as to provide, as a whole, full vertical and horizontal flexibility in assembly of said flower box, and further comprising wall partitions which are provided with through holes and with corresponding components of said reversible anchoring devices, and wherein each one of said bottoms is constituted by a monolithic tray-like element which is provided perimetrically and externally with two or more laminar tabs which are suitable to enter holes formed at a corresponding shaped region of the lower portion of said wall elements or in said partitions.

2. The flower box according to claim 1, wherein each one of said first reversible anchoring devices comprises a first tab shaped like a contoured hook which is monolithic with respect to one side of a corresponding wall element and is suitable to enter and anchor itself in a corresponding through hole provided in the corresponding post, the rim of said hole being shaped so as to define, in an upward region, a first elastically flexible wing which is suitable to ensure the engagement and locking of said first inserted tab, each one of said first anchoring device, also comprising a corresponding second elastically flexible disengagement wing which is suitable to face, upon assembly, a corresponding said first wing and is available to the action of the operator so as to disengage it from the locking of the corresponding first tab.

3. The flower box according to claim 1, wherein said wall element is constituted by a panel provided with internal reinforcement ribs and folded edges.

4. The flower box according to claim 2, wherein said second wing is provided with a portion for assisting elastic bending with an imaginary pivoting axis which lies above the corresponding first tab.

5. The flower box according to claim 2, wherein said wall elements and the corresponding post have a plurality of said first devices.

6. The flower box according to claim 1, wherein one or more of said posts have a polygonal cross-section.

7. The flower box according to claim 2, wherein one or more of said posts are each provided with at least two series of said holes and first wings.

8. The flower box according to claim 2, wherein one or more of said posts have a rectangular cross-section.

9. The flower box according to claim 2, wherein one or more of said posts are each provided with two series of said holes and said first wings on mutually opposite sides.

10. The flower box according to claim 2, wherein one or more of said posts are each provided with three series of said holes and said first wings on adjacent sides so as to ensure connection to corresponding T-shaped wall elements.

11. The flower box according to claim 1, wherein one or more of said posts are each provided with four series of said holes and corresponding first wings, arranged on adjacent sides so as to ensure a cross-shaped assembly of corresponding wall elements.

12. The flower box according to claim 1, wherein each one of said posts has longitudinal edge ribs for guiding the insertion of said wail elements.

13. The flower box according to claim 1, wherein said posts are tubular and are associated in a downward region with a plug which is coupled adjustably to a corresponding foot.

14. The flower box according to claim 13, wherein said foot is constituted by a screw element with a head for resting on the ground and a threaded stem which is coupled to a corresponding threaded hole formed in said plug.

15. The flower box according to claim 1, wherein said bottom is provided with a perimetric folded edge which rests for centering on a corresponding recess fanned in the corresponding wall elements or in said partitions.

16. The flower box according to claim 1, wherein said bottom is fixed to corresponding wall elements by means of corresponding second reversible anchoring devices.

17. The flower box according to claim 16, wherein each one of said second anchoring devices comprises a rod-like element with one or more bridge-like sections which are suitable to enter corresponding holes formed in the corresponding wall element or in a corresponding partition, so as to lock the corresponding rim together with the part of said folded edge of the respective bottom.

18. The flower box according to claim 17, wherein each one of said bridge-like sections comprises two parallel flaps which are suitable to form a corresponding number of grip jaws and, in an upward region, a lug which is suitable to reversibly engage in the rim of the insertion hole.

19. The flower box according to claim 1, wherein said bottom is provided with spacing and supporting studs for a grilled panel which in turn is provided with frustum-shaped feet.

20. The flower box according to claim 19, wherein said studs are seats of castors.

21. The flower box according to claim 1, further comprising shaped upper plugs having a tang which can be inserted in the corresponding posts.

22. The flower box according to claim 1, further comprising bases having a tubular tang for the insertion and support of frames of trellises.

23. The flower box according to claim 22, wherein said bases have a monolithic vertical pin which is suitable to enter said frames in order to allow side-by-side extension of corresponding trellises.

24. The flower box according to claim 1, further comprising connecting elements with corresponding reinforcement ribs which are suitable to be inserted in said posts so as to allow a stacked extension of said flower box.

\* \* \* \* \*